Aug. 3, 1937.  W. C. HANSON  2,088,741
SUPPORTING AND SEPARATING RACK
Filed May 11, 1936   2 Sheets-Sheet 1
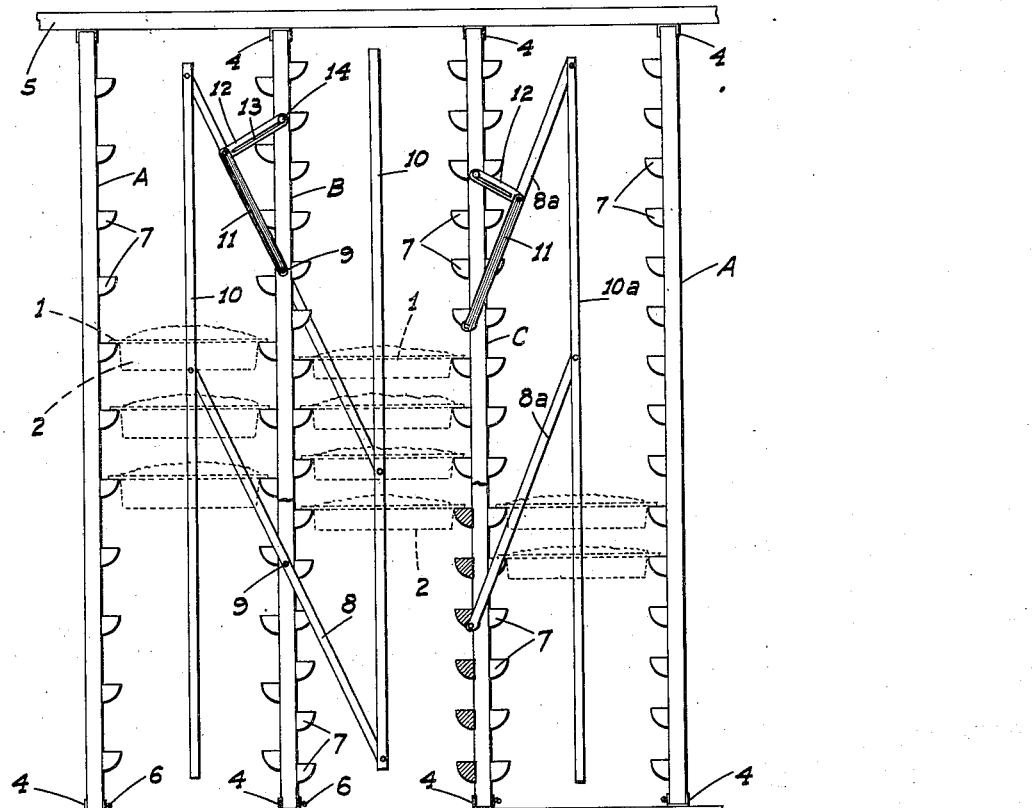
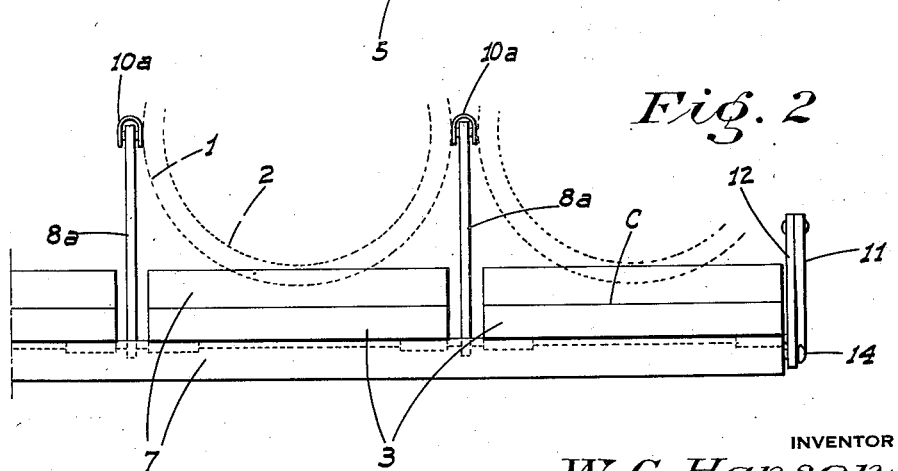
INVENTOR
W. C. Hanson
BY
ATTORNEY Aug. 3, 1937. W. C. HANSON 2,088,741
SUPPORTING AND SEPARATING RACK
Filed May 11, 1936 2 Sheets-Sheet 2

INVENTOR
W. C. Hanson
BY
ATTORNEY

Patented Aug. 3, 1937

2,088,741

UNITED STATES PATENT OFFICE 2,088,741

SUPPORTING AND SEPARATING RACK

Walter C. Hanson, Sacramento, Calif., assignor of one-half to David R. McKinley, Sacramento, Calif.

Application May 11, 1936, Serial No. 79,031

11 Claims. (Cl. 211—41)

This invention relates generally to a supporting and separating rack and is directed in particular to a rack for supporting pie pans and the like in horizontal rows and in separated relation to each other.

The principal object of my invention is to provide a rack especially adapted for transporting pies in pie plates or pans in a motor truck or similar vehicle.

With modern rapid transportation facilities a bakery produces pies at a central plant and then distributes such pies to retail stores over a relatively large territory. This requires suitable racks in the trucks to support the pies and prevent damage thereto during transit.

A further object of my invention therefore is to provide a supporting rack for pie pans which is arranged to facilitate loading and unloading of the pans into a transporting position in the truck, and to maintain the individual pans in each horizontal row in separated relation to each other during transit. This eliminates the possibility of the pies "piling up" as the truck encounters rough roads or when the driver suddenly applies the brakes.

An additional object of my invention is to provide a rack of the character described which has a large capacity, is easy to clean and affords easy access to any particular variety of pie which may be in the rack.

A further object is to provide a rack which may be readily removed from the body of the truck or other vehicle in the event that it is desired to clean the rack or if it is desired to use the truck as an open type, that is one having its load carrying area unobstructed by the presence of the rack.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a front elevation partly in section of a complete rack unit as installed and in operation.

Fig. 2 is a fragmentary top plan of a single-separator panel of the unit.

Figure 3:
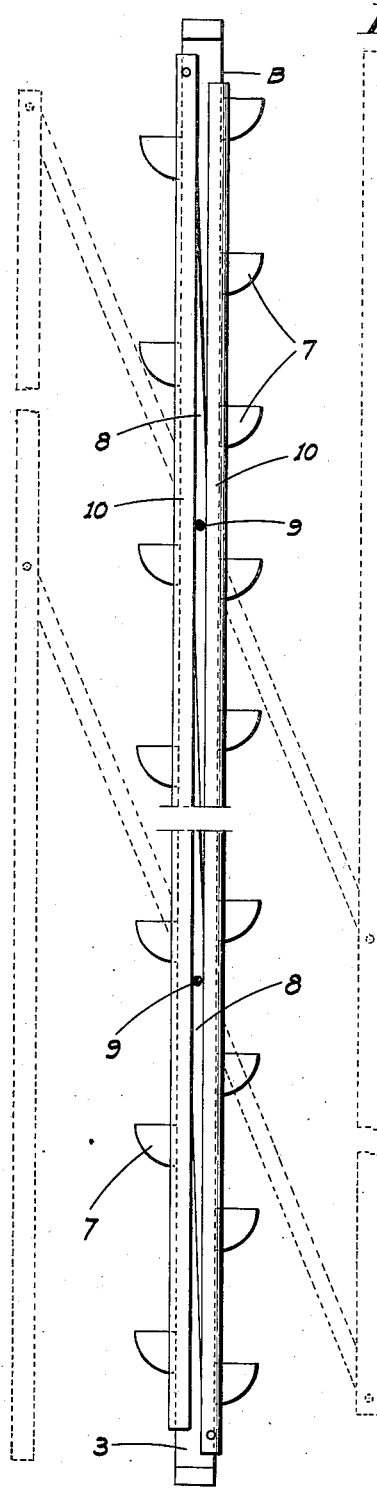
Fig. 3 is an enlarged transverse vertical section of a double-separator panel, with the separators retracted.
Figure 4:
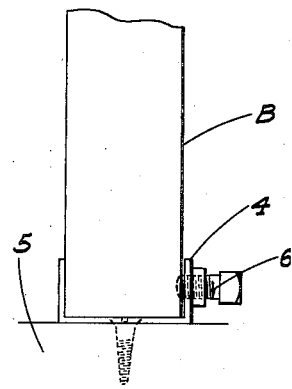
Fig. 4 is a fragmentary front view of a panel showing the removable mounting of the same.

Referring now more particularly to the characters of reference on the drawings, the complete rack unit as herein disclosed comprises end panels A and intermediate panels B and C, the distance between adjacent panels being somewhat greater than the diameter of the rim 1 of a standard pie or other pan 2 to be supported by the rack. All the panels are of the same size and panels B and C comprise a number of vertical panel sections 3 spaced approximately one inch apart, the width of each section being substantially equal to the diameter of the pan rim 1, as indicated in Fig. 2.

Each panel is slidably supported at the top and bottom in channels 4 mounted on the corresponding fixed elements 5 in the truck or other vehicle; the bottom channels preferably having set screws 6 mounted in the sides thereof to releasably engage the panels and prevent undesired sliding of the same. In this manner the various parts constituting the main features of the rack may be easily removed from the truck and the load area of the latter may thus be left unobstructed and free for other uses, if desired.

Pan-rim supporting ledges 7, disposed in suitable vertically spaced relation, are mounted on the panels throughout their height; the space between the ledges on the adjacent faces of an adjacent pair of panels being different from those on the other panels, if desired, so that pans of different depths may be carried, as indicated in Fig. 1.

The ledges on the panel A are only on one side of the same and are continuous. On the panel B they are on both sides and are separated in accordance with the separation of the panel sections. On the panel C the ledges are continuous along the side facing the panel B but are separated on the side facing the adjacent panel A, as shown in Figs. 1 and 2. The space between each adjacent pair of panels is thus arranged to support a large number of pans, vertically and horizontally, the number depending of course on the height and depth or horizontal extent of the panels.

To maintain the pans in the various horizontal rows separated from each other without interfering with their placement or removal when necessary, I provide the following structure.

Figure 5:
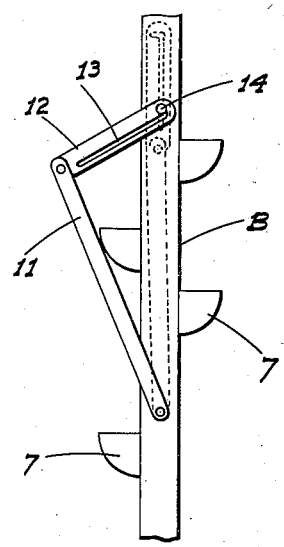
Fig. 5 is a fragmentary front view showing the control and stop means for the separators.

Disposed between the panel sections of the panel B are vertically spaced arms 8, secured centrally of their ends on rods 9 which are turnably mounted in and also serve to connect the various panel sections. The arms at their outer ends are pivotally connected to vertical separator bars 10, preferably of U-shaped form in section, as shown in Fig. 2, and whose width is less than that of the spaces between the panel sections. The front end of one rod 9 is connected to a control arm 11, parallel to the arms 8, on the outer end of which a link 12 is pivoted. This link has a longitudinal slot 13 engaged by a pin 14 fixed in the front of the panel. This slot has an upward offset at the end engaged by the pin when the arms 8 are at a certain angle to the panel and the separator bars are substantially midway between adjacent panels, as shown in Fig. 1, so as to releasably lock the bars in such position. When the link is released by hand from this locking position and the control arm is swung to a vertical position, the arms 8 assume a corresponding position. Said arms and the separator bars then fold into each other and are received into the spaces between the panel sections, as shown in Fig. 3; the link then likewise being vertically disposed, as indicated in dotted lines in Fig. 5. The separator structure is thus completely retracted and does not offer any interference with the sliding of the pans into or out of supporting position on the various ledges.

When the rows of pans have been slid into position on the rack ledges in abutting relation, the separator arms are swung out by proper operation of the control arm 11. This causes the rounded separator bars to engage the diverging edges of the abutting pan rims and force the latter apart somewhat as indicated in Fig. 2. Said bars of course also then hold the pans in this separated relationship and prevent one pan from possibly piling onto another with the jolting or sudden change of movement incidental to the travel of the truck on which the rack is mounted.

The double separator unit above described takes care of the separation of all the pans between the panel B and the adjacent panel A, and between the panels B and C. Only a single separator unit is thus necessary for the pans located in the space between the panel C and the adjacent panel A. For this reason, the arms 8a of said panel C terminate at their pivoted end and have a single separator bar 10a at their outer end. This being the case, the ledges 7 on the side of the panel C facing the panel B may be continuous and thus act to brace and strengthen the panel.

It is to be understood that while I have shown and preferably use ledges to support the pans at the rims, ordinary shelves may be used on which to directly rest the pans.

Also, the term "pan" is intended to cover not only the conventional metal pans, but the pressed paper plates and similar containers now commonly used, as well.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A pan supporting rack including vertical, horizontally spaced panels, horizontal ledges mounted on adjacent faces of the panels to engage the rims of pans in supporting relation, the length of the ledges being sufficient to each support a plurality of pans in a row, means mounted on one panel to project between and separate adjacent supported pans and maintain them separated, and control means to simultaneously move said last named means in and out of a pan separating position.

2. A pan supporting rack including vertical, horizontally spaced panels, horizontal ledges mounted on adjacent faces of the panels to engage the rims of pans in supporting relation, the length of the ledges being sufficient to each support a plurality of pans in a row, separator bars adapted to project between adjacent pans of the row to maintain them separated, and means mounting said bars on one panel for simultaneous movement into and out of a pan separating position.

3. A pan supporting rack including vertical, horizontally spaced panels, horizontal ledges mounted on adjacent faces of the panels to engage the rims of pans in supporting relation, the length of the ledges being sufficient to each support a plurality of pans in a row, separator bars normally disposed substantially in the vertical plane of one panel and between adjacent pans supported on the ledges, and means mounting the bars on said panel for movement across the space between the panels into separating position between the pans.

4. A pan supporting rack including vertical, horizontally spaced panels, horizontal ledges mounted on adjacent faces of the panels to engage the rims of pans in supporting relation, the length of the ledges being sufficient to each support a plurality of pans in a row, and there being a plurality of vertically spaced ledges whereby to support a number of horizontal rows of pans in superimposed relation, and means mounted on one panel and operable from the front of the rack to separate adjacent pans of all the rows simultaneously and maintain such pans separated.

5. A pan supporting rack including vertical, horizontally spaced panels, horizontal ledges mounted on adjacent faces of the panels to engage the rims of pans in supporting relation, the length of the ledges being sufficient to each support a plurality of pans in a row, and there being a plurality of vertically spaced ledges whereby to support a number of horizontal rows of pans in superimposed relation, vertical separator bars disposed in planes to project between adjacent pans of all the rows simultaneously, and means to move the bars transversely of the space between the panels into or out of a pan separating position selectively.

6. A pan supporting rack including vertical, horizontally spaced panels, horizontal ledges mounted on adjacent faces of the panels to engage the rims of pans in supporting relation, the length of the ledges being sufficient to each support a plurality of pans in a row, and there being a plurality of vertically spaced ledges whereby to support a number of horizontal rows of pans in superimposed relation, vertical separator bars disposed in planes to project between adjacent pans of all the rows simultaneously, means mounting the bars in connection with one panel for movement transversely of the space between the panels from a position centrally of the pans to one immediately adjacent said one panel, and means applied to the bar mounting means to thus move the bars.

7. A pan supporting rack including vertical, horizontally spaced panels, horizontal ledges mounted on adjacent faces of the panels to engage the rims of pans in supporting relation, the length of the ledges being sufficient to each support a plurality of pans in a row, and there being a plurality of vertically spaced ledges whereby to support a number of horizontal rows of pans in superimposed relation, vertical separator bars disposed in planes to project between adjacent pans of all the rows simultaneously, a vertically spaced pair of arms for each bar projecting from one panel, a pair of pivot rods on which all the pairs of rods are secured, means pivoting the arms at their other end on the corresponding bars, and means applied to one rod to turn the same and to control the extent of projecting movement of the bars.

8. A structure as in claim 7, in which said means comprises a handle arm secured at one end on one rod at the front of the panel, a link pivoted at one end on the outer end of the handle arm, said link having a longitudinal slot, and a pin fixed in the panel and riding in the slot.

9. A pan supporting rack including vertical, horizontally spaced panels, horizontal ledges mounted on adjacent faces of the panels to engage the rims of pans in supporting relation, the length of the ledges being sufficient to each support a plurality of pans in a row, and there being a plurality of vertically spaced ledges whereby to support a number of horizontal rows of pans in superimposed relation, vertical separator bars disposed in planes to project between adjacent pans of all the rows simultaneously, one panel comprising a number of spaced sections, the horizontal extent of each of which is substantially equal to the diameter of a pan at its rim, a vertically spaced pair of arms for each bar projecting from between the spaced sections and pivoted at their outer end on the corresponding bar, pivotal mounting means on said one panel for all the arms, and means to swing the arms simultaneously to move the bars from a position between the pans in separating relation thereto to one substantially between the opposite faces of the panel.

10. A rack for supporting a number of individual pieces of merchandise in a row, comprising vertical, horizontally spaced panels, means mounted on the panels to support a row of such merchandise pieces therebetween, means mounted on one panel to project between and separate adjacent supported pieces and maintain them separated, and control means to simultaneously move said last named means in and out of a pan separating position.

11. A rack for supporting a number of individual pieces of merchandise in rows, comprising vertical, horizontally spaced panels, means mounted on the panels to support a number of vertically spaced horizontal rows of such merchandise pieces therebetween, and means mounted on one panel and operable to simultaneously separate all the pieces of merchandise in the different rows and maintain them separated.

WALTER C. HANSON.